Patented Feb. 23, 1926.

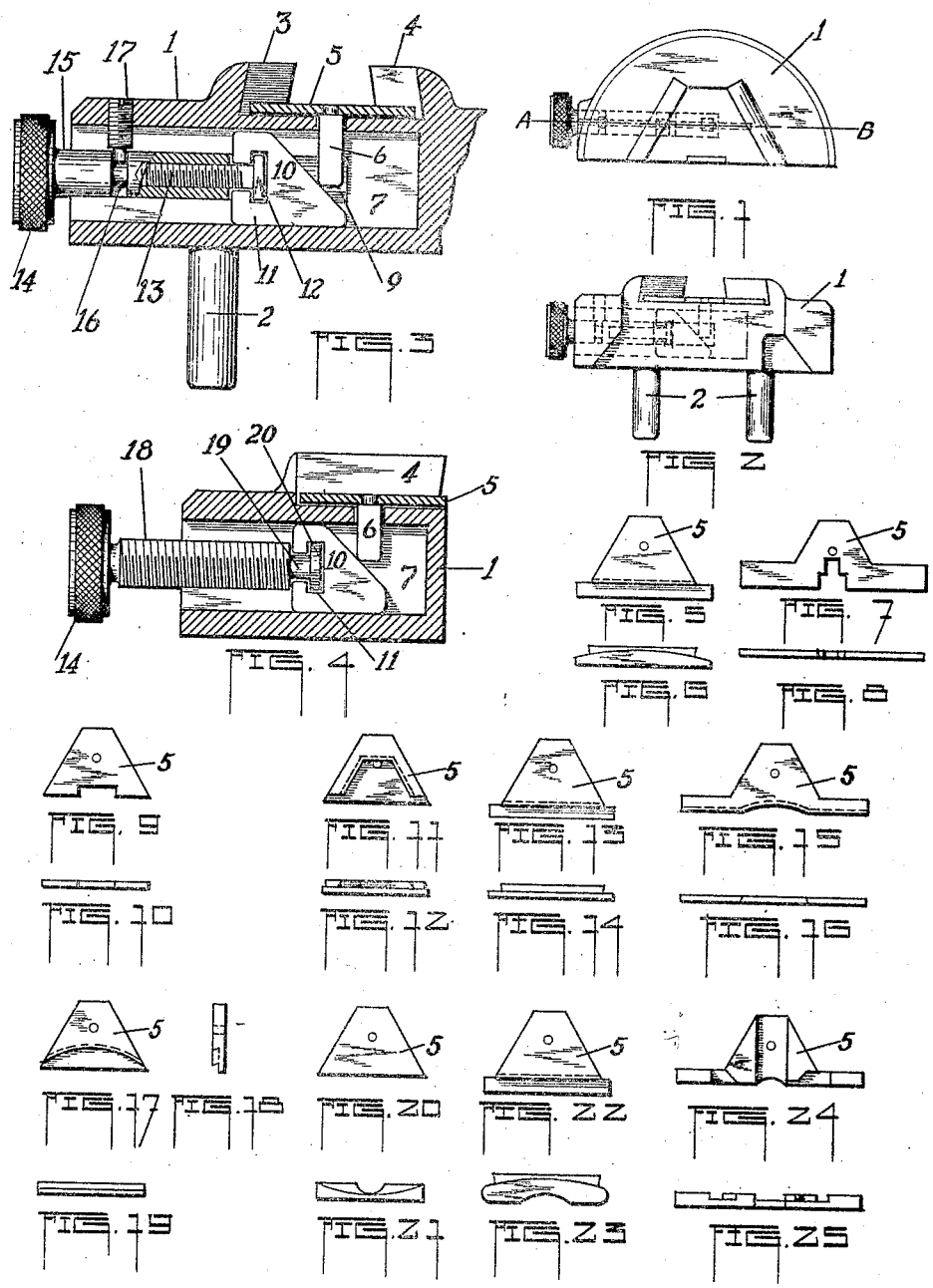
Feb. 23, 1926.
C. E. LINNIG
JAW FOR ENGRAVERS' CLAMPS
Filed Jan. 2, 1923
1,574,585

1,574,585

UNITED STATES PATENT OFFICE.

CHARLES EDWARD LINNIG, OF PERU, ILLINOIS.

JAW FOR ENGRAVERS' CLAMPS.

Application filed January 2, 1923. Serial No. 610,203.

*To all whom it may concern:*

Be it known that I, CHARLES EDWARD LINNIG, a citizen of the United States, and a resident of the city of Peru, county of La Salle, and State of Illinois, have invented certain new and useful Improvements in Jaws for Engravers' Clamps, of which the following is a specification.

My invention relates to improvements in jaws for engravers' clamps and has for its object the production of jaws which have integral within themselves positioning means that are controlled and adjusted independent of the movement of the movable parts or members of engravers' clamp similar to that shown in my Patent No. 1,420,715 granted June 27th, 1922 or any of the usual engravers' clamp already used in the art.

I attain these objects by the means shown in the accompanying drawings in which;

Figure 1 shows a top view of one of my jaws.

Figure 2 shows a front view of one of my jaws.

Figure 3 is a partial cross sectional view of one of my jaws along a line AB of Figure 1.

Figure 4 is a similar cross-sectional view of a modification of one of my jaws.

Figure 5 is a top view of a movable part or shelf for one of my jaws.

Figure 6 is a front view of the part shown in Figure 5.

Figure 7 is a top view of another movable part or shelf for my jaws.

Figure 8 is a front view of the part shown in Figure 6.

Figure 9 is a top view of another movable part or shelf.

Figure 10 is a front view of the part shown in Figure 9.

Figure 11 is a top view of another movable part or shelf.

Figure 12 is a front view of the part shown in Figure 11.

Figure 13 is a top view of another movable part or shelf.

Figure 14 is a front view of the part shown in Figure 13.

Figure 15 is a top view of another movable part or shelf.

Figure 16 is a front view of the part shown in Figure 15.

Figure 17 is a top view of another movable part or shelf.

Figure 18 is a side view of the part shown in Figure 17.

Figure 19 is a front view of the part shown in Figure 17.

Figure 20 is a top view of another movable part or shelf.

Figure 21 is a front view of the part shown in Figure 20.

Figure 22 is a top view of another movable part or shelf.

Figure 23 is a front view of the part shown in Figure 22.

Figure 24 is a top view of still another movable part or shelf for my jaws.

Figure 25 is a front view of the part shown in Figure 24.

Similar numerals represent similar parts throughout the several views.

In the several views 1 represents the body of my jaw which has the pins 2 by means of which it is attached to the movable and stationary members of an engraver's clamp. Body 1 also has two suitably shaped projections 3 and 4 between which is located a movable part or shelf 5 having a pin 6 fastened into the aperture shown and slidably mounted and projecting into a chamber 7 in body 1 which is a narrow vertically and rectangular in shape and has a cylindrical chambered part 9 formed into its sides as shown. Slidably mounted in 7 is a member 10 having the inclined face shown and a notched portion 11 into which is fitted the rectangular head 12 of screw or bolt 13 whose threaded portion fits into a threaded aperture in knurled thumb nut 14 which has a cylindrical part 15 which is journaled in the cylindrical part of chamber 7 above mentioned. Part 15 has a notch 16 cut out of its cylindrical surface into which projects a pin 17 which pin 17 is adjustably mounted in body part 1 by means of the screw threads shown. It will be seen from the construction above described that turning the knurled thumb nut 14 in one direction will force the screw bolt 13 forward pushing the member 10 forward and as the inclined face of 10 contacts with pin 6 it raises the shelf 5 upwardly and as 15 is turned in the opposite direction the member 10 is similarly drawn away from the pin 10 and the shelf 5 is lowered.

In the modification shown in Figure 4 the knurled thumb nut 14 has a threaded part 18 which registers with a threaded aperture in chamber 7 in body part 1 and has a notch 19 with a circular head 20 which rotates in notch 11 of the part 10 so that in turning knurled thumb nut 14 it moves in and out similarly to force the member 10 forward and backward same as above described for the mechanism shown in Figure 3.

The parts shown in the various figures from 5 to 25 inclusive are the different shelves 5 for holding different kinds of work.

In use my device is operated as follows: The work or piece to be held is placed on the shelf 5 it of course being understood that there is a similar holding jaw 1 mounted on the engraver's clamp above mentioned, and the jaws 1 are brought together until the parts 3 and 4 of each jaw overlap the work when shelf 5 is raised to finally clamp the work between itself and parts 3 and 4 by turning knurled thumb nut 14 as above described or the work may be similarly held in the space between the shelf 5 and either part 3 or 4 or both of them so that each part 1 is a holding device in itself.

It will be understood, of course, that while I have here shown one form of my invention, I do not wish to limit it to the exact form shown, but desire to have it taken in a sense illustrative of any or all forms of my invention that come fairly within the scope of my claim.

I claim:—

In holding jaws for engravers' clamps, a body part having an aperture, a plurality of projections integral with said body part, the inner side of which projections slant toward each other, a pin slidably mounted in said aperture, a plate adjacent to said projections fastened to said pin, in combination with a lifting member, having an inclined face slidably mounted in said body part, a suitable notch in said lifting member and a suitably shaped thumb screw connected to said lifting member and mounted in said body part.

CHARLES EDWARD LINNIG.